Dec. 9, 1952　　　R. F. MORRISON ET AL　　　2,620,753
CANDY SLICING MACHINE
Filed July 21, 1947　　　　　　　　　　　　　　8 Sheets-Sheet 1
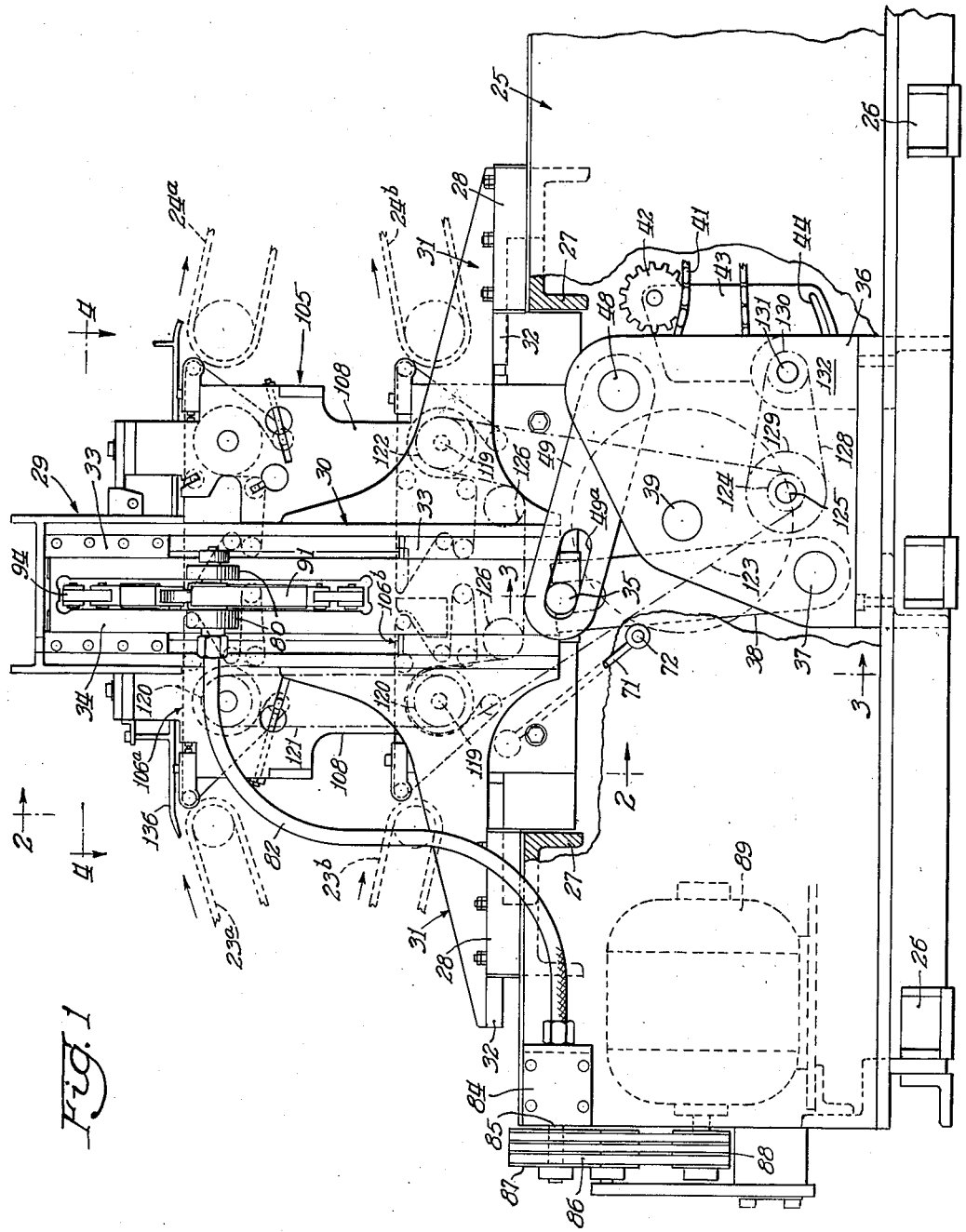
Inventors:
Robert F. Morrison
Ernest C. Clement
By: Zabel and Fitzhaugh
Attys

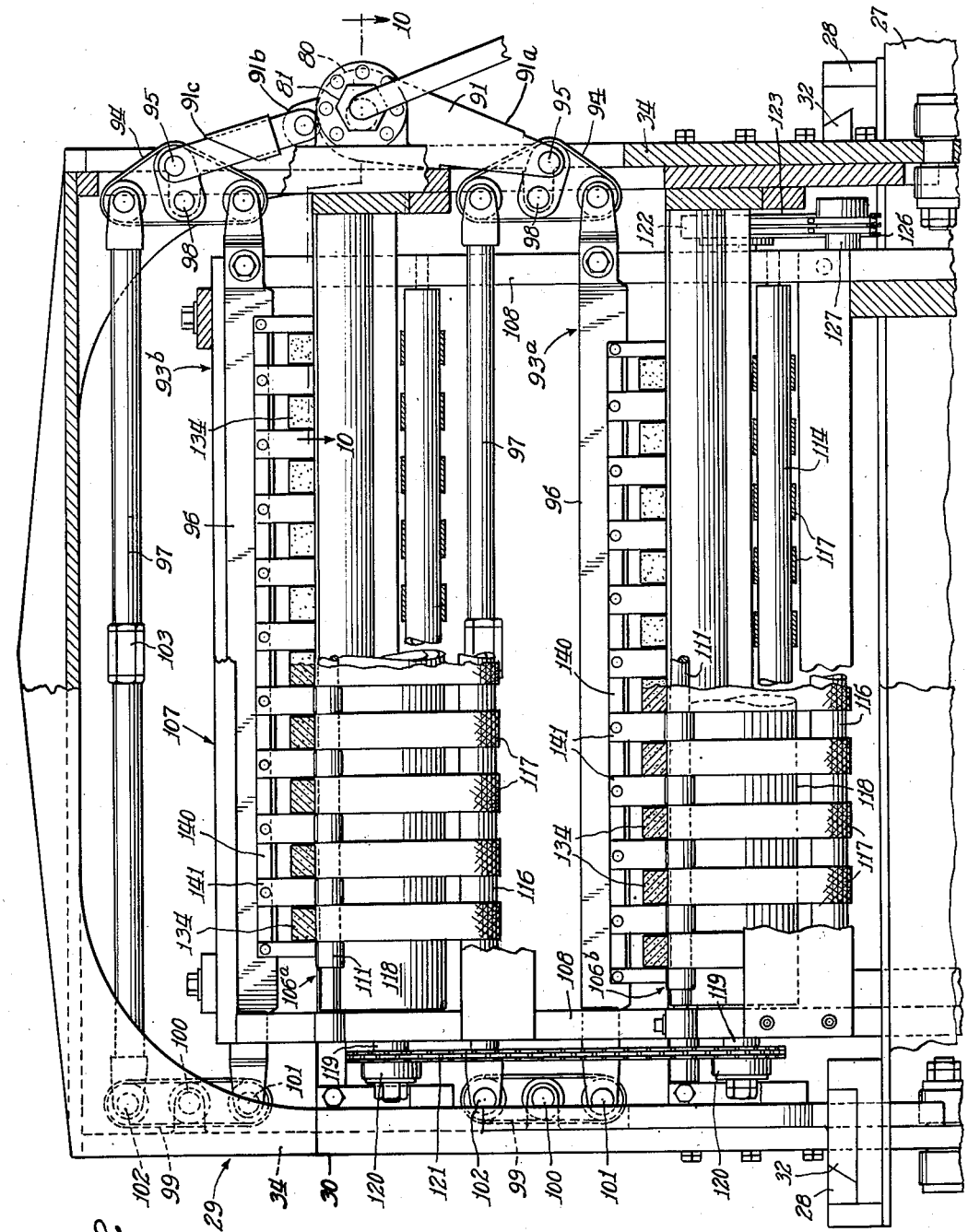

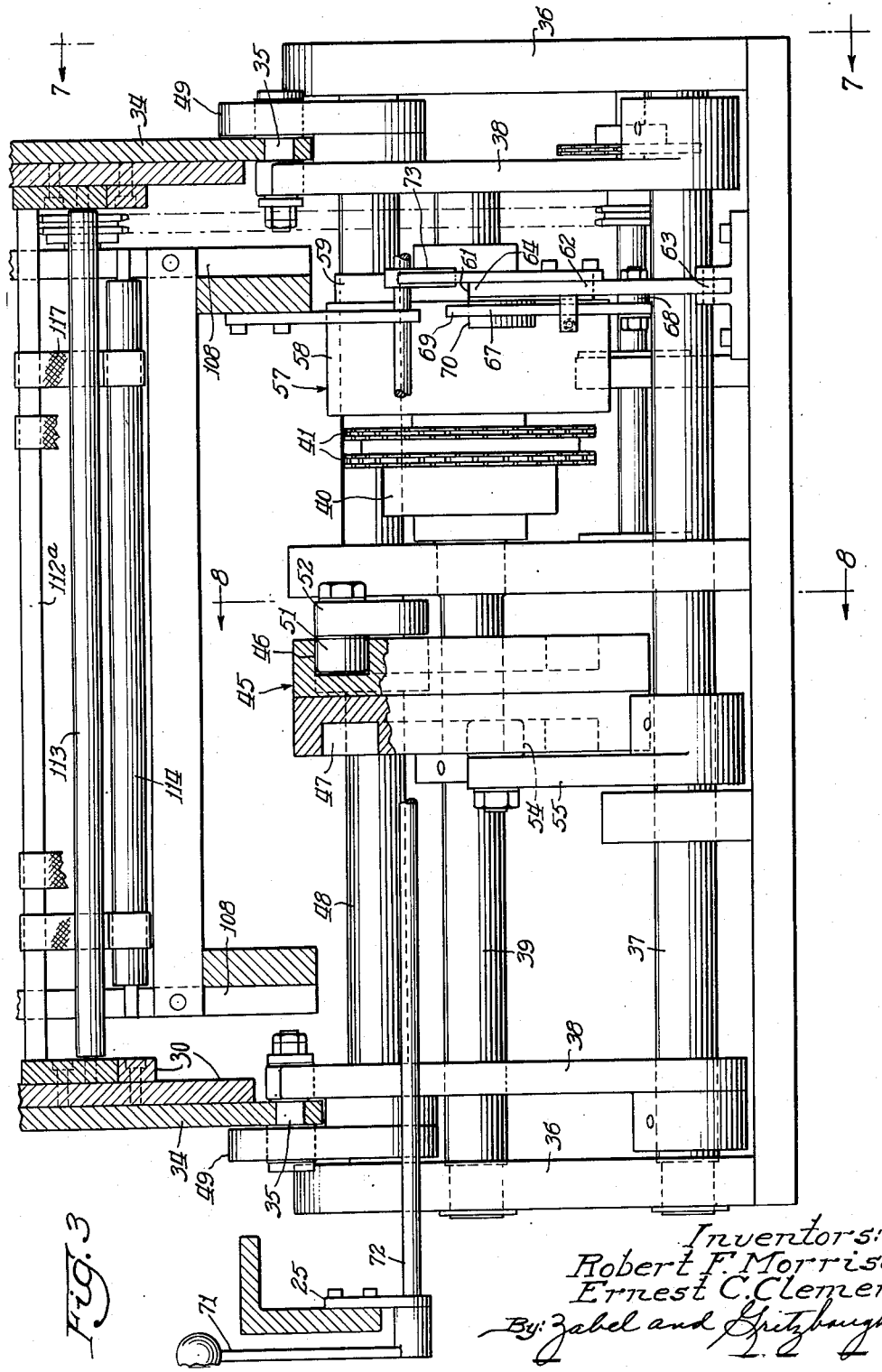

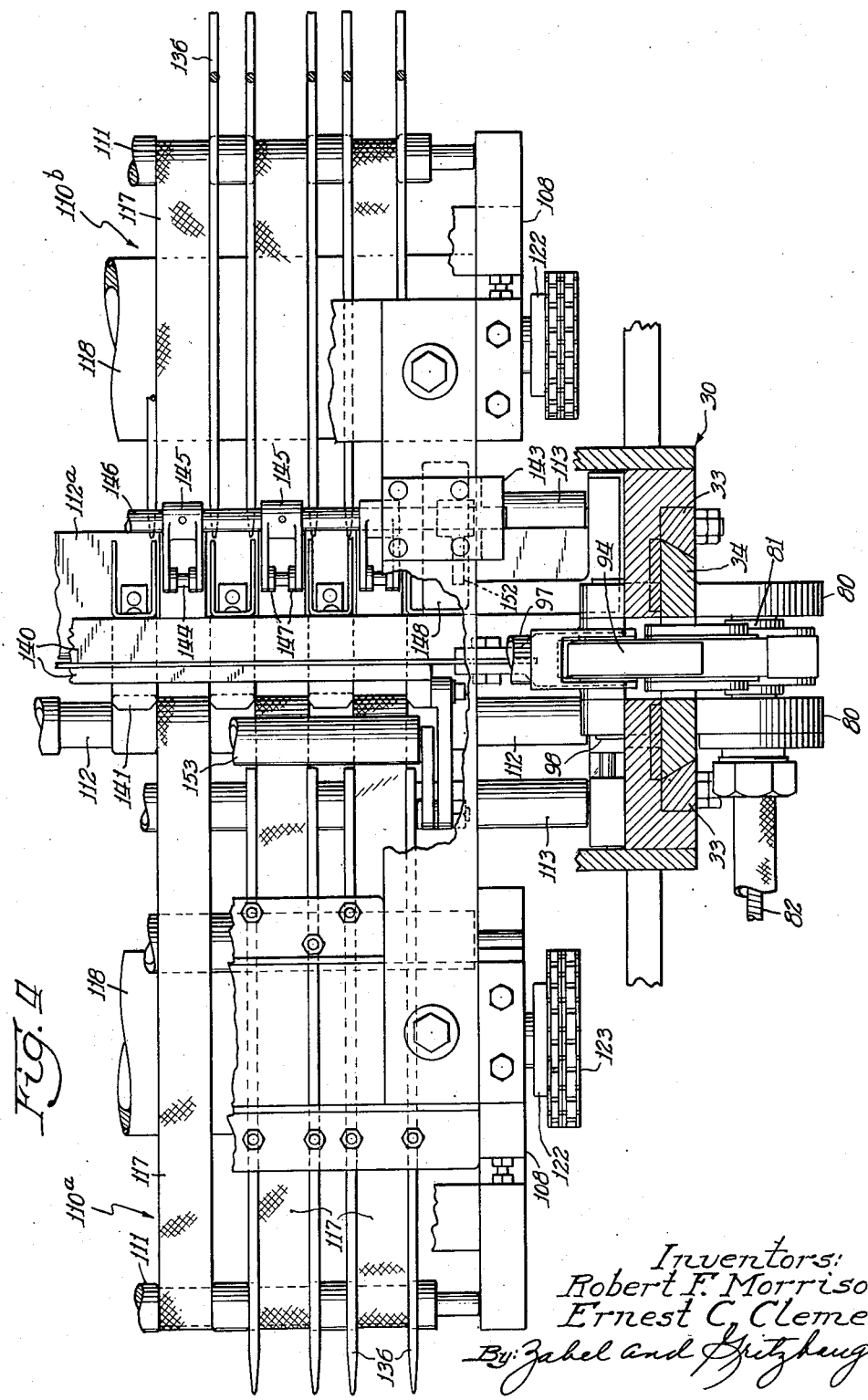

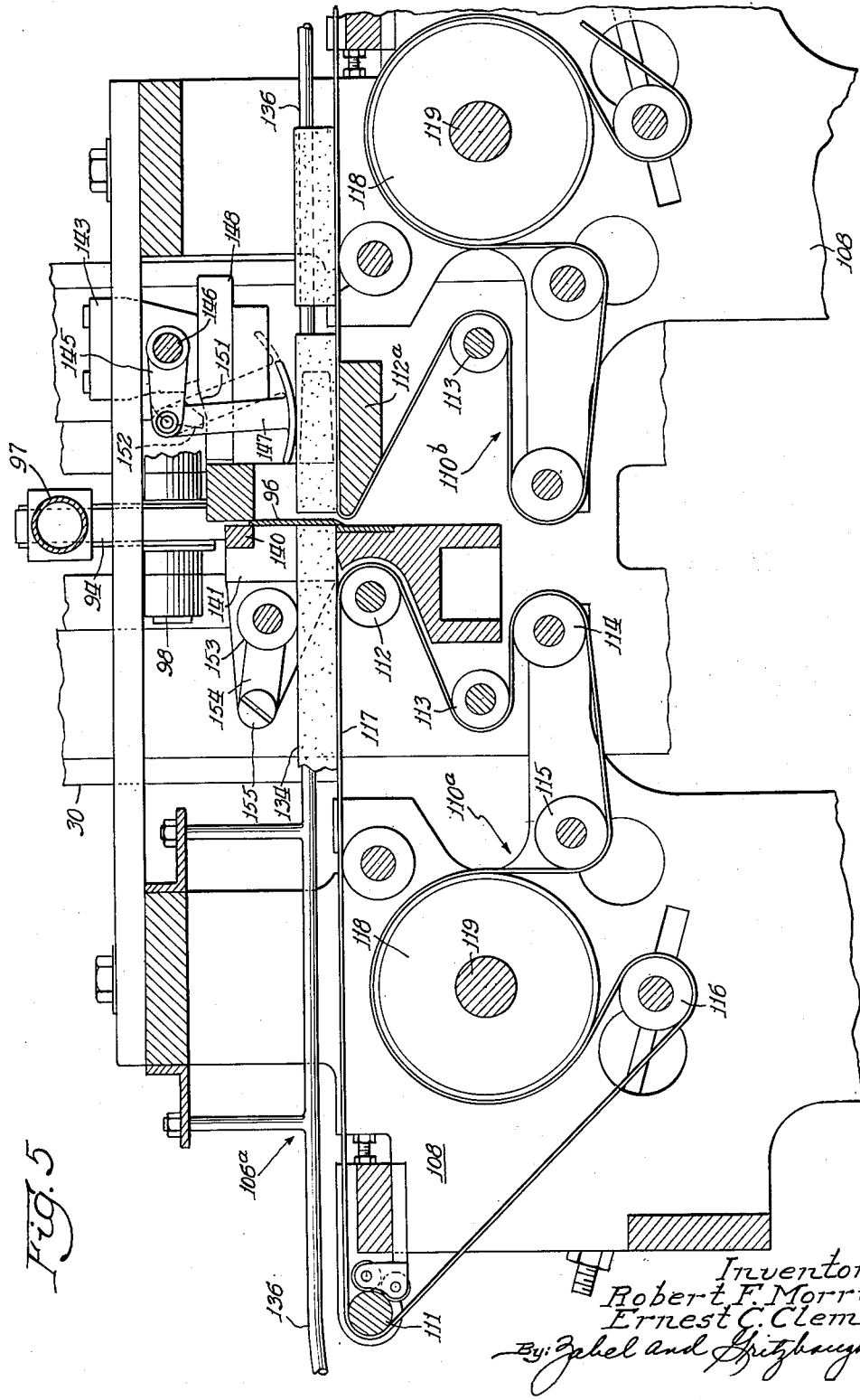

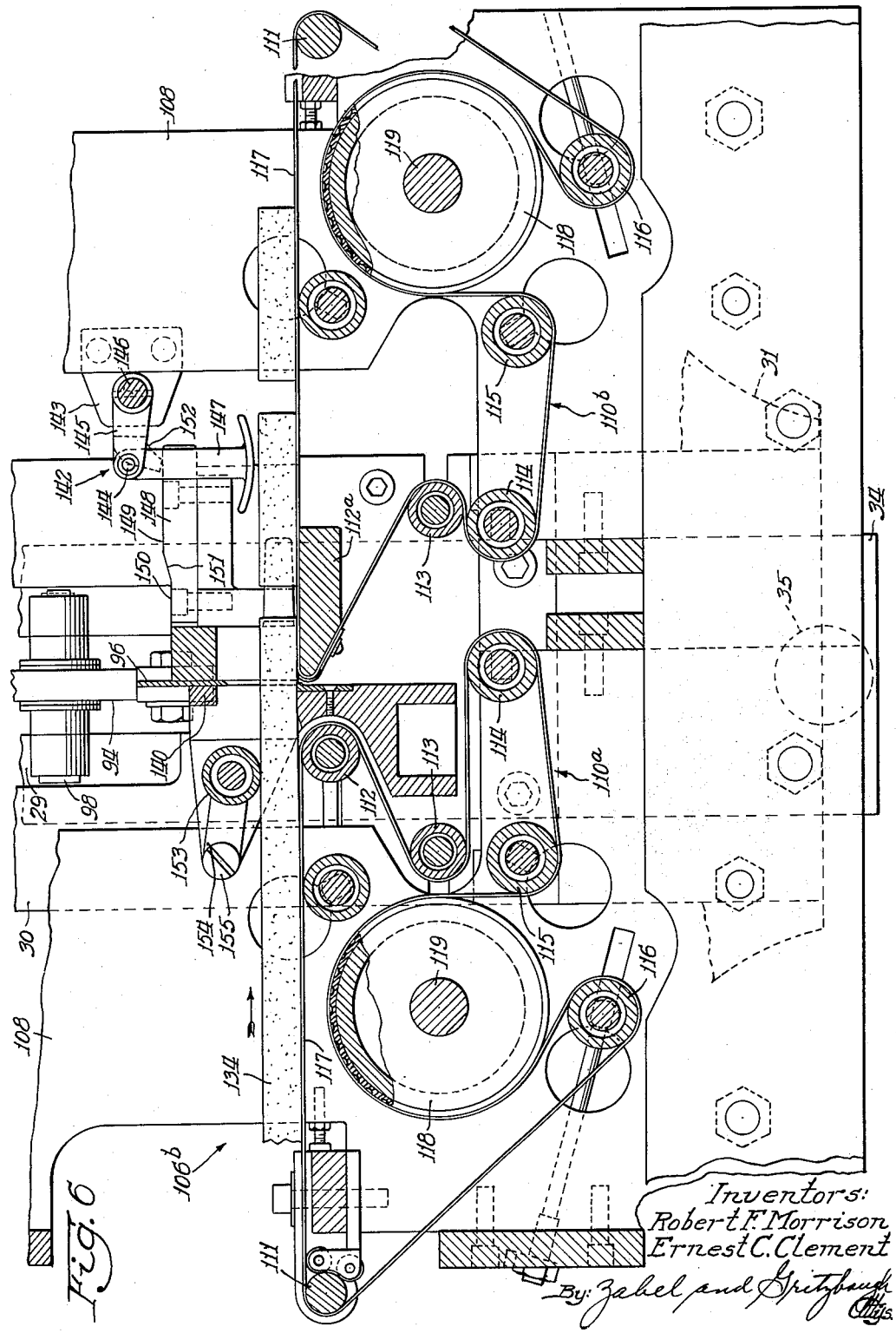
Dec. 9, 1952 — R. F. MORRISON ET AL — 2,620,753
CANDY SLICING MACHINE
Filed July 21, 1947 — 8 Sheets-Sheet 6
Inventors:
Robert F. Morrison
Ernest C. Clement
By: Zabel and Gritzbaugh
Attys.

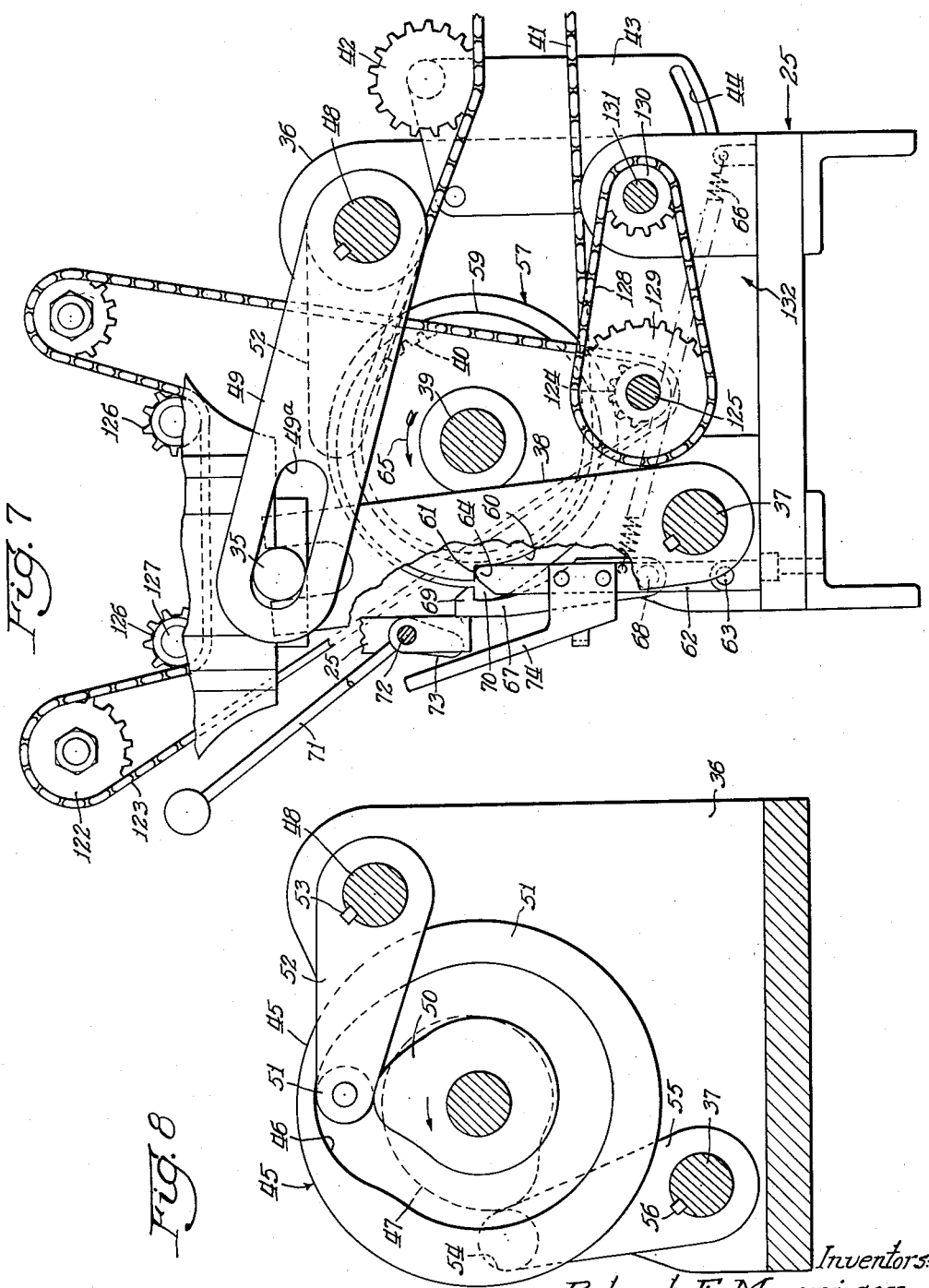

Dec. 9, 1952  R. F. MORRISON ET AL  2,620,753
CANDY SLICING MACHINE

Filed July 21, 1947  8 Sheets-Sheet 8

Inventors:
Robert F. Morrison
Ernest C. Clement
By: Zabel and Fritzhaugh
Attys.

Patented Dec. 9, 1952

2,620,753

UNITED STATES PATENT OFFICE 2,620,753

CANDY SLICING MACHINE

Robert F. Morrison, Oak Park, and Ernest C. Clement, Chicago, Ill., assignors to Mars, Incorporated, Chicago, Ill., a corporation of Delaware Application July 21, 1947, Serial No. 762,426

11 Claims. (Cl. 107—21)

The present invention is concerned with the manufacture of candy bars and relates primarily to the slicing of strips of candy into bar sizes or lengths. The invention contemplates that the candy dough is first prepared and thoroughly mixed in one or more batch mixers, or the like, and this dough is spread evenly in the form of a sheet onto a continuously moving table or belt. This sheet of candy may comprise numerous layers built up in the form of a unitary sheet that is fed at a uniform rate into a slitting device that slits the sheet into elongated strips or ribbons. These strips in turn are fed into the slicer forming the subject matter of the present invention. A more complete description of this complete operation may be found in the co-pending application of Robert F. Morrison, Serial No. 762,145, filed July 19, 1947.

An object of the present invention is to provide relatively simple equipment that effectively slices strips or ribbons of candy into bars of uniform lengths. It is intended that this be performed as a continuous operation without the necessity of the human hand touching the candy. It is further intended to provide a slicer that comprises a minimum number of parts and one where the requirement for maintenance is reduced to a minimum. The candy bars cut by the present device are intended to have ends that are straight and are at right angles to the lower and upper faces of the bars, as well as with respect to the sides of the bars so that the resulting bar has neither been defaced nor distorted by the slicing operation.

The foregoing constitute some of the principal objects and advantages of the present invention, others of which will become apparent from the following description and the drawings, in which:

Fig. 1 is a side elevational view of the slicer forming the subject matter of the present invention;

Fig. 2 is a vertical transverse sectional view through the upper portion of the device, the view being taken on the line 2—2 of Fig. 1;

Fig. 3 is a vertical transverse sectional view taken through the lower portion of the device, the view being taken on the line 3—3 of Fig. 1;

Fig. 4 is a horizontal sectional view taken along the line 4—4 of Fig. 1;

Fig. 5 is a vertical, longitudinal sectional view taken through the upper portion of the slicer shown in Fig. 1, the view being taken substantially along the longitudinal center line of the device;

Fig. 6 is an enlarged, vertical longitudinal sectional view through the lower portion of the device shown in Fig. 1;

Fig. 7 is a side elevational view of a fragment of the device, the view being taken along the line 7—7 of Fig. 3;

Fig. 8 is a transverse sectional view taken along the line 8—8 of Fig. 3;

Figure 9:
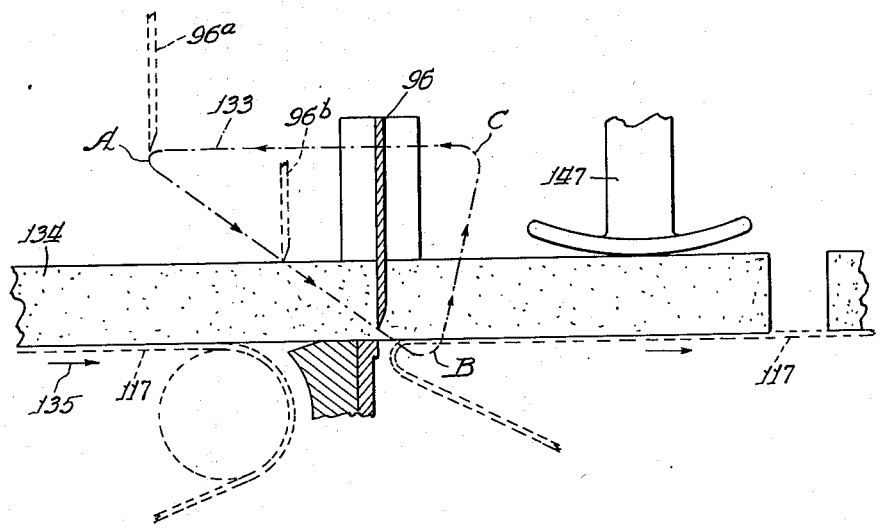
Fig. 9 is a more or less diagrammatic view illustrating the direction of travel of the cutting knives with respect to the movement of the candy during the cutting operation.

The present specification includes subject matter that is disclosed in the copending application of Ernest C. Clement, entitled Candy Slicing Machine, Serial No. 76,877, filed February 17, 1949.

For purposes of illustration a specific embodiment of the present invention has been selected, it being recognized however that numerous modifications will occur to the man skilled in the art, and it is intended that such modifications may be made without departing from the spirit and intended scope of the invention.

The slicing equipment known as a slicer described herein is ideally suited for use in connection with the making of candy bars consisting of a wide variation of ingredients put together in accordance with many different formulae, such for example as caramel, toffee, marshmallow and nougat, or a combination of these materials. Specifically speaking, the nougat is a batter-like mix made of aerated egg whites and a syrup of sugar, salt, water and corn syrup; and after thoroughly beating this mix to provide additional aeration, vegetable oil, malted milk and cocoa are added and all are thoroughly mixed together. This mix or dough known as nougat may then be introduced through spreading equipment onto a moving conveyor. This conveyor moves this nougat through certain stations, if desired, where caramel and nuts or the like may be spread thereon and this resulting sheet of candy is then first slit lengthwise into strips which are then alternately conveyed to lower and upper levels by means of a device known as a separator. This separator is indicated in broken lines in Fig. 1, the upper level being indicated at 23a and the lower level at 23b. The strips are then deposited by the separator onto the bar slicer that forms the subject matter of the present invention. After the bars have been sliced into lengths they are conveyed onto a suitable conveyor device having upper and lower levels 24a and 24b that then transfer the bars back to a common level where the bars are then deposited upon a conveyor belt that moves them into a chocolate enrober.

Referring to the drawings and particularly to Fig. 1, the slicer comprises generally a frame indicated at 25 that is supported on a plurality of feet 26. This frame includes sides, ends and numerous cross braces, most of which have been omitted for purposes of clarity and only those framing members which are deemed to be important for a full disclosure of the invention are shown. This frame includes a pair of cross braces 27 (Fig. 1) that are spaced longitudinally along the frame 25 and are welded or otherwise secured to the sides of the frame. Supported on these cross braces 27 are spaced bearing blocks 28, there being one of such bearing blocks at each end of each cross brace 27. Mounted on these bearing blocks 27 is an inverted U-shaped frame generally indicated at 29 (Fig. 2) that is provided with spaced vertically disposed legs, one of which is shown at 30 in Fig. 1. The bottom of each inverted leg 30 is provided with a foot portion 31 that provides a forwardly and rearwardly projecting bearing plate 32, each of which is mounted for sliding movement on the corresponding bearing block 28. Thus the U-shaped frame 29 is adapted to slide back and forth on the bearing blocks 28 in a direction from left to right and return as shown in Fig. 1.

Each leg 30 is provided with a vertical slot formed between spaced upper and spaced lower bearing members 33, in each of which vertical slots is mounted a plate 34 that is adapted to reciprocate vertically between the bearing members 33. This slidable plate 34 is fixed by the bearing members 33 against longitudinal movement with respect to the U-shaped frame 29. Mounted on the lower end of each of the plates 34 is a lug 35.

An upstanding bearing member 36 (see Figs. 1 and 3) is disposed at each side of the frame 25 and a shaft 37 is journalled at its opposite ends in these spaced bearing members 36. An arm 38 on each side of the machine is pivotally mounted adjacent to its lower end on the shaft 37 and is bifurcated on its upper end so as to receive the lug 35 between its furcations.

Also journalled in the spaced upright bearing members 36 is a shaft 39 (see Figs. 1 and 3) on which is mounted a drive sprocket wheel 40 (see Figs. 3 and 7) about which operates a sprocket chain 41 that is powered from a suitable motor (not shown). Gear reduction facilities may be provided in this motor drive if desired, and as shown in Fig. 7 in order to take up and adjust the slack in the sprocket chain 41 an idler pulley 42 may be provided, the adjustment being made possible by movement of a plate 43 upon which the idler pulley 42 is mounted, this movement being effected between a slot 44 and suitable locking means (not shown) cooperating with the slot.

As best shown in Figs. 3 and 8 a double cam member 45 is mounted on the shaft 39 and is fixed to the shaft so as to rotate therewith. The cam member is provided with a cam track 46 in one face thereof that serves to transform rotary motion of the shaft 39 into vertical reciprocating motion of the sliding plates 34 in a manner to be presently described. The other face of the cam member 45 is provided with a cam track 47 that transforms rotary motion of the shaft 39 into reciprocating motion of the U-shaped frame 29 in a manner also to be presently described.

Again referring to Fig. 1 a shaft 48 is journalled in the spaced upright bearing members 36 and mounted on this shaft adjacent each end thereof is an arm 49 that at one end is keyed or otherwise fixed to the shaft. The other end of each arm 49 is provided with an elongated slot 49a in which the lug 35 on the bottom of the plate 34 is adapted to slidingly fit.

Referring now to Fig. 8 the cam track 46 in the cam member 45 is formed by and between a central cam boss 50 and a marginal flange 51 that is spaced from the cam boss 50. A cam follower 51 rides in the cam track 46 and this cam follower is mounted on the end of an arm 52 that is keyed as at 53 to the shaft 48. Thus as the cam member 45 rotates the cam follower 51 riding in the cam track 46 transmits backward and forward rotary motion to the shaft 48. Referring now to Fig. 1 this backward and forward rotary motion of the shaft 48 transmits similar rotational reciprocating movement of the arm 49 so as to raise and lower the corresponding sliding plate 34 on each leg 30 of the U-shaped frame 29.

Again referring to Fig. 8 the cam track 47 on the opposite face of the cam member 45 is provided with a follower 54 that rides in the track. This cam follower 54 is mounted on the end of an arm 55 that is mounted on the shaft 37 at its opposite end and is keyed or otherwise secured to the shaft as indicated at 56. Thus as the shaft 39 rotates the motion of the follower 54 is transmitted to the shaft 37 in the form of back and forth rocking motion. Referring to Fig. 1 this movement of shaft 37 is conveyed from each arm 38 to the lug 35 thereby transmitting horizontal reciprocating movement to the U-shaped frame 29.

Referring now to Figs. 3 and 7 an over-riding clutch 57 is mounted on the shaft 39, the clutch being adapted to transmit rotary motion of the drive sprocket 40 to the shaft 39. This clutch 57 may be a conventional over-riding clutch and for purposes of illustration comprises a driving clutch member 58 that is powered directly by the sprocket wheel 40 and a driven clutch member 59 that is pinned or otherwise secured to the shaft 39. The peripheral face of the driven clutch member 59 (see Fig. 7) is cammed as indicated at 60 so as to provide a stop or shoulder 61. An arm 62 pivoted at its lower end at 63 to a part of the frame 25 is provided at its upper end with a follower 64. Thus as the shaft 39 rotates in the direction of the arrow indicated at 65 the follower 64 riding along the cammed peripheral surface of the driven clutch member 59 engages the shoulder or stop 61 so as to stop the rotation of the driven member 59. A tension spring 66 spring biases the arm 62 to a position against the cammed surface of the driven clutch member 59. A locking arm 67 is pivoted at 68 to the arm 62 and is provided with a locking head 69 that engages a shoulder member 70 that is disposed on the periphery of the driving clutch member 58 (Figs. 3 and 7). The function of this locking head 69 is to prevent backward rotation of the driving clutch member 58 as the result of bouncing off the follower 64 when the driving clutch member 58 is suddenly brought to rest. An operating handle 71 is pivoted on a shaft 72 mounted on the frame 25. Shaft 72 is provided with a foot 73 that is fixed adjacent to an arm 74 (Fig. 7). This operating handle 71 is adapted to rotate back and forth about its pivot point 72 so as to similarly rotate the foot 73. This foot 73 engages an arm 74 that is fixed to the pivoted arm 62 so that when the operating handle 71 is rotated in a clockwise direction the foot 73 engages arm 74 so as to move pivoted arm 62 in a counterclockwise direction about its pivot point 63 thereby withdrawing the cam follower head 64 out of contact with the shoulder or stop 61. This releases the driven clutch member 59, causing the latter to be powered or rotated by the driving clutch member 58. Thus the shaft 39 is released so as to be driven from the drive sprocket 42 and the U-shaped frame 29 is reciprocated back and forth while at the same time the sliding plates 34 are vertically reciprocated. To stop this operation, handle 71 is returned to the position shown in Fig. 7.

Figure 10:
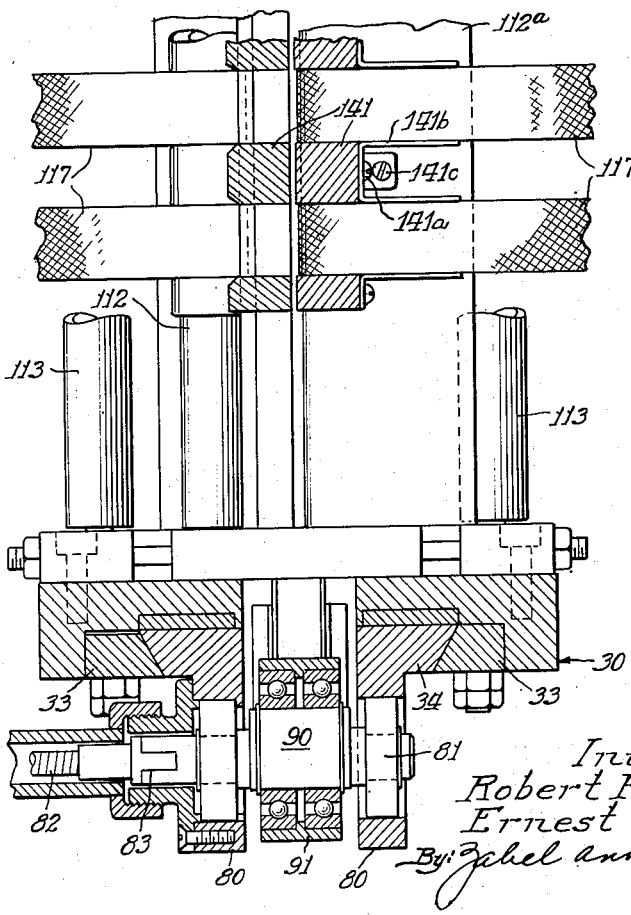
Fig. 10 is a horizontal sectional view through the device, the view being taken along the line 10—10 of Fig. 2.

Mounted on one of the vertical sliding plates 34 is a pair of spaced bearing members 80 (Figs. 1, 4 and 10) in which is journalled a shaft 81. To this shaft 81 is suitably connected a flexible shaft 82 that is keyed as at 83 (see Fig. 10) to the shaft 81. This flexible shaft 82 is connected through a conventional gear box 84 (see Fig. 1) to a power shaft 85 that is driven by belts 86 through pulleys 87. The belts 86 operate over pulleys 88 on the end of a suitable driving motor 89.

Again referring to Figs. 1, 4 and 10 the shaft 81 is provided with an eccentric portion 90 upon which is mounted a bell crank 91 (see Fig. 2) that comprises two arms 91a and 91b. Lower and upper knife assemblies 93a and 93b respectively are provided at the opposite ends of the bell crank 91, rocker arms 94 serving to connect each knife assembly to the corresponding end of the bell crank 91. Each of these rocker arms 94 is more or less triangular in shape and is respectively pivotally mounted at its apex as at 95 to arm 91a and one end of an extendable link 91c, the latter of which is pivotally connected at its other end to arm 91b of the bell crank 91.

At the lower corner of each triangular rocker arm 94 is mounted a knife blade 96 and at the upper corner of each rocker arm 94 is a connecting rod 97 that is pivotally secured to the rocker arm. Each of the rocker arms 94 is pivotally mounted on a shaft 98 that is carried by sliding plate 34. At the opposite side of the device is a link 99 that is disposed opposite each rocker arm 94 and each of such links 99 is pivoted at its center as indicated at 100 to the adjacent plate 34. To the lower end of the link 99 is pivotally attached as at 101 the free end of the adjacent knife blade 96 and to the upper end of the link 99 is pivotally attached as at 102 the free end of the adjacent connecting rod 97. Upon rotation of the shaft 81 (Figs. 2 and 10) the eccentrically mounted bell crank 91 is caused to move up and down so as to rock the upper and lower rocker arms 94 about their respective pivot points. This motion of the rocker arms 94 transmits horizontal oscillating motion to the knife blades 96. As best shown in Fig. 2 the connecting rods 97 may be split and provided with a take-up mechanism indicated at 103 for adjusting the tension in each of the knife blades 96.

Thus there is provided a U-frame 29 (Fig. 1) that is powered to reciprocate back and forth in a horizontal direction longitudinally of the device, and this frame 29 is provided with vertical moving plates 34 that are reciprocated in a vertical direction simultaneously with the horizontal movement of the U-frame 29. The plates 34 in turn support two knife assemblies that are disposed crosswise of the machine and are spaced one above the other. These assemblies include knives that are reciprocated in a horizontal transverse direction with respect to the slicing device. It is to be noted that the reciprocation of the knives is brought about by the motor 89 that is separate from the power drive to the U-frame 29 and plates 34.

Mounted on the frame 25 so as to be straddled by the U-frame 29 is a bar conveying assembly 105 that provides upper and lower candy slicing levels or platforms generally indicated in Figs. 1 and 2 at 106a and 106b respectively. These slicing levels 106a and 106b are identical and for that reason one only will be described in sufficient detail to understand the present invention.

The candy bar conveying assembly 105 comprises a frame generally indicated at 107 that includes spaced side frame members 108 (Fig. 2) held together and stiffened by numerous cross braces. As indicated in Fig. 5 where only the upper slicing level 106a is shown the knife blade 96 is disposed transversely of the slicer, and the conveyor unit generally indicated at 110a adapted to convey the candy strips into the region of the knife 96 is substantially identical with the conveyor unit generally indicated at 110b that conveys the sliced bars away from the knife blade 96. The same is also true with respect to the lower slicing level indicated at 106b in Fig. 6.

Each of such conveyor units on the input or feed side of the knives 96 comprises a pair of spaced rollers 111 and 112, the former being suitably journalled in the spaced side frame members 108 and the latter being suitably journalled in legs 30 (Fig. 10) of the movable inverted U-frame 29. A plurality of guide rollers 113, 114, 115 and 116 spaced as shown in Figs. 5 and 6 with respect to each other provide a circuitous path for a plurality of conveyor belts 117. Guide rollers 114, 115 and 116 are journalled in upright frame members 108, while roller 113 is journalled in legs 30 of the movable inverted U-frame 29. A power driven drum 118 is mounted on a shaft 119 that is likewise journalled in the spaced upright frame members 108. The drum 118 is preferably provided with a rubberized treated peripheral surface so as to provide traction for the belts 117 that pass over the surface of this drum.

Referring to Figs. 5 and 6, as above mentioned the rollers 112 and 113 in each instance are journalled in the vertically disposed legs 30 of the U-frame 29 so that as the U-frame 29 moves back and forth the rollers 112 and 113 travel with the U-frame. The rollers 111, 114, 115 and 116 and the drum 118 on the other hand are mounted between the fixed side frame members 108 (see Fig. 2) so that the axes of these rollers in each instance are stationary. Thus the distances between the rollers 112 and 113 on the one hand and the remaining rollers on the other vary during the movement of the U-frame 29. The conveyor belts 117 merely feed back and forth on the various rollers to compensate for this relative variation in spacing between the two groups of rollers and no slack develops in conveyor belts 117. In other words, referring to Fig. 5, as roller 112 moves to the left with legs 30 toward fixed roller 111, the slack that would otherwise develop in the upper course of belts 117 is compensated for by a corresponding movement of roller 113 to the left away from fixed roller 114.

It is to be noted in Figs. 5 and 6, that in the case of the discharge conveyor unit 110b disposed to the right of the knife blades 96, a guide block 112a is carried by legs 30 (Fig. 3) and it is employed instead of roller 112. This guide block 112a further serves the same purpose as the roller 112 but extends closer to the knife 96 than the roller 112 and hence provides better support for the cut candy bars. The remainder of conveyor unit 110b is identical with conveyor 110a.

As shown in Fig. 2 each shaft 119 projects through one of the upright frame members 108 and has a sprocket wheel 120 fixed to the end thereof. A sprocket chain 121 operates about each pair of upper and lower sprocket wheels 120 that are mounted on each set of upper and lower drum shafts 119. The lower shaft 119 projects through the opposite upright frame member 108 and is provided with a sprocket wheel 122 that is powered by a sprocket chain 123 that passes over a sprocket wheel 124 (Fig. 1) that is mounted on a shaft 125, this shaft being journalled between the upright bearing members 36. The drive chain 123 as indicated in Fig. 1 passes over sprocket wheels 122 on each of the upper shafts 119 and also passes over a pair of spaced idler pulleys 126, each of which is mounted on a stud shaft 127 (see Fig. 2). As shown in Fig. 4 the sprocket wheel 122 on the right hand side of the machine is smaller in diameter than sprocket wheel 122 on the left hand side so that drums 118 on the exit side of the knife blades 96 (both upper and lower) are rotated at a faster speed than the drums 118 on the other side of the machine. Thus the candy bars are moved away from the knives rapidly and are spaced apart endwise. The shaft 125 in turn is powered by a sprocket chain 128 operating about a sprocket wheel 129 on the shaft 125 and a sprocket wheel 130 mounted on the end of a shaft 131 that may be the shaft of a motor or a motor powered gear reduction device 132.

Thus when the motor or motor driven reduction device 132 is placed into operation conveyor belts 117 (Figs. 1, 4, 5 and 6) on both slicing levels 106a and 106b are placed into operation so as to convey candy in a direction reading from left to right in Fig. 1. During the time the candy is being thus conveyed a motor drive through the drive sprocket 40 (see Figs. 1 and 7) places the U-frame 29 in horizontal reciprocating motion and also places the sliding plates 34 on each leg 30 of the U-frame 29 into vertical reciprocating motion. The knife blades 96 on both levels are then placed into operation by energizing the motor 89 (Fig. 11) so that the slicer then operates to convey the continuous strips of candy into the knife blades 96 where the blades cut the strips into bar lengths and then the bars are conveyed from the blades to the discharge end of the device.

Referring now to Fig. 9 the net effect of these various motions of the U-frame, sliding plates and knife blades is diagrammatically indicated by the broken line 133. The strips of candy are indicated at 134 and these strips are being moved in the direction of the arrow 135 by the conveyor belts 117. In its uppermost position each knife blade 96 assumes the position shown at 96a in Fig. 9 well above the strips of candy that are being conveyed into the cutting region. As the U-frame 29 that supports each of the knife blades 96 moves from left to right at a speed corresponding to the advance movement of the candy strips 134 the knife blade 96 is moved downwardly to a position 96b where it engages the upper faces of the strips of candy. During the remainder of the travel of the U-frame the knife blade 96 passes downwardly through the candy strips 134 and since the U-frame 29 carrying each of the knife blades 96 is travelling exactly at the same rate of speed as the strips of candy 134 for the reason hereinafter explained there is no relative horizontal movement therebetween. Thus the knife blade 96 passes vertically through the candy strips and at the end of the cutting operation the knife blade is lifted rapidly in a substantially vertical direction as indicated by the right hand portion of the broken lines 133 in Fig. 9. The blade is then returned to its initial raised position indicated at 96a and the operation is repeated. The relationship between the various cams, link and speeds in the instant case, of course, can be varied but it has been found that a travelling time of two-thirds of a second from a position marked A in Fig. 9 to the end of the cutting operation at B with a rapid retracting time of one-third of a second between positions B and C will give very satisfactory results.

As shown in Fig. 4 suitable guide bars 136 may be disposed relative to the conveyor belts so as to guide the candy strips and bars entering and leaving the slicer so as to prevent lateral displacement of the bars during their movement through the slicer.

As shown in Fig. 2 a guard bar 140 is disposed on each side of each of the knife blades 96 and this bar includes a plurality of downwardly projecting spacer members 141 between which the strips of candy indicated at 134 pass. The spacers 141 are screwed as at 141a (Fig. 10) to a channel member 141b, or an angle member in the case of the end spacers, which in turn is screwed as at 141c to a horizontal member 112a of the machine frame.

Referring to Fig. 6 a pressure device generally indicated at 142 is mounted by means of brackets 143 upon the stationary side frame members 108 and this pressure device includes a shaft 144 fixed in the free end of spaced arms 145 that are fixed to a rotatable shaft 146 in the brackets 143. Suspended from the shaft 144 are a plurality of pressure feet 147 that are free to rotate about the fixed shaft 144.

Projecting outwardly from the adjacent guard member 140 is a cam block 148 that is provided with an upper cam surface having an upper level 149 and a lower level 150 divided by an inclined surface 151. A cam follower 152 is fixed with respect to the arms 145 and is adapted to ride on the upper cam surface of the cam strip 148. Thus as the U-frame indicated at 29 in Fig. 6 moves from left to right the fixed cam strip 148 likewise moves under the cam follower 152. When the inclined surface 151 reaches the position of the stationary cam follower 152 the follower rides down this inclined surface to the lower surface 150, during which movement the arm 145 rotates about the center of shaft 146 so as to lower the pressure feet 147. These pressure feet 147 are so disposed that one is provided above each candy bar that is passing therebeneath and when the pressure feet are disposed in their lowermost position, that is when the lower cam surface 150 is located beneath the cam follower 152, the pressure feet 147 are engaging and bearing down on the candy bars therebeneath. In this manner proper friction is provided between the candy bars and the conveyor belts therebelow so as to eliminate all possibility of slippage of the belts beneath the candy bars. Thus when the cutting operation has been completed, in which condition the pressure feet 147 are lowered onto the candy bars, the frictional engagement of the candy bars with the conveyor belts therebelow is assured so that the candy bars are rapidly moving away from the cutting knife.

A pressure roller 153 is provided to rest on the strips of candy at the entrance side to the knife blade 96. This pressure roller is mounted on a pair of spaced arms 154 that are pivoted about suitable fulcrum points 155. Thus the weight of the roller 153 provides downward pressure on the strips of candy fed therebeneath so as to assure proper frictional engagement of the candy with the conveyor belts therebeneath so as to eliminate slippage of the belts with respect to the candy.

Proper take-up devices are shown for taking up slack in the various belts and chains but since they are conventional and form no part of the present invention a detailed description is believed unnecessary.

We claim:

1. The combination of a base, a vertically disposed frame, means mounting the frame for horizontal reciprocation on the base, a conveyor including belt means mounted for movement to the frame, a second conveyor mounted on the other side of the frame and for movement away from the frame, a knife supporting member slidably mounted for vertical movement on the frame, and means mounting the knife for reciprocation on the knife supporting member in a transverse direction with respect to the first conveyor, power means drivingly connected to the frame for imparting horizontal reciprocating movement thereto and to the knife supporting member to impart vertical slidable movement thereto, and independent power means drivingly connected to the knife mounting means to impart transverse reciprocation to the knife.

2. The combination of a base, an inverted U-shaped frame on the base, bearing block means on the base adjacent to the lower end of each leg of the U-shaped frame, means on the U-shaped frame mounting the frame for horizontal reciprocation on the bearing block means, a knife supporting member mounted on each leg of the U-shaped frame and slidable vertically on the leg, a knife disposed horizontally between the legs of the frame, and means on each knife supporting member and secured to the knife for mounting the knife for reciprocation on the frame in a direction at right angles to the direction of horizontal movement of the frame, power means drivingly connected to the U-shaped frame for imparting the reciprocating movement thereto and to the knife supporting movement impart sliding movement thereto, and independent power means drivingly connected to the knife mounting means to impart the reciprocation to the knife.

3. The combination of a base, an inverted U-shaped frame on the base, bearing block means on the base adjacent to the lower end of each leg of the U-shaped frame, means on the U-shaped frame mounting the frame for horizontal reciprocation on the bearing block means, a lower and an upper cutting platform, spacers dividing the platform into segments and extending in the direction of horizontal movement of said frame between the legs of the U-shaped frame, a lower and an upper knife supporting member supported on each leg of the U-shaped frame and slidable vertically on the leg, the lower knife supporting members being horizontally spaced apart and forming a pair of supports for a lower knife, the upper knife supporting members being horizontally spaced apart and forming a pair of supports for an upper knife, a knife disposed horizontally between each pair of knife supporting members and spanning all of the segments, and means on each knife supporting member and secured to the adjacent knife for mounting the knife for reciprocation on the frame in a direction at right angles to the direction of horizontal movement of the frame.

4. The combination of a base, an inverted U-shaped frame on the base, bearing block means on the base adjacent to the lower end of each leg of the U-shaped frame, means on the U-shaped frame mounting the frame for horizontal reciprocation on the bearing block means, a lower and an upper cutting platform, spacers dividing the platform into segments and extending in the direction of horizontal movement of said frame between the legs of the U-shaped frame, a lower and an upper knife supporting member supported on each leg of the U-shaped frame and slidable vertically on the leg, the lower knife supporting members being horizontally spaced apart and forming a pair of supports for a lower knife, the upper knife supporting members being horizontally spaced apart and forming a pair of supports for an upper knife, a knife disposed horizontally between each pair of knife supporting members and spanning all of the segments, and means on each knife supporting member and secured to the adjacent knife for mounting the knife for reciprocation on the frame in a direction at right angles to the direction of horizontal movement of the frame, and conveyor means including an upper and a lower belt mounted for movement toward the upper and lower knives respectively, and an upper and lower belt disposed on the opposite side of the knives and mounted for movement away from the upper and lower knives respectively.

5. The combination of a base, an inverted U-shaped upright frame on the base, a lower and an upper cutting platform, spacers dividing the platform into segments and extending in the direction of horizontal movement of said frame between the legs of the U-shaped frame, a pair of upper and a pair of lower knife supporting members slidably mounted on each leg, a knife disposed horizontally between each pair of knife supporting members and spanning all of the segments, each of the knife supporting members providing reciprocation of the knife in a direction parallel to the length of the knife.

6. The combination of a base, an inverted U-shaped upright frame on the base, a lower and an upper cutting platform, spacers dividing the platform into segments and extending in the direction of horizontal movement of said frame between the legs of the U-shaped frame, a pair of upper and a pair of lower knife supporting members slidably mounted on each leg, a knife disposed horizontally between each pair of knife supporting members and spanning all of the segments, each of the knife supporting members providing reciprocation of the knife in a direction parallel to the length of the knife, and upper and lower conveyor means movable to the paths of the upper and lower knives, respectively.

7. The combination of a base, a pair of horizontally spaced upright supports on the base, a lower and an upper cutting platform, spacers dividing the platform into segments and extending in the direction of horizontal movement of said frame between the legs of the U-shaped frame, a pair of upper and a pair of lower knife supporting members slidable in a vertical direction on the supports, a knife disposed horizontally between each pair of knife supporting members and spanning all of the segments, each knife supporting member providing reciprocation of the knife in a direction parallel to the length of the knife.

8. The combination of a vertically disposed frame, a stationary base, means mounting the frame for horizontal reciprocation on the base, a conveyor including a pulley member rotatably mounted on the stationary base, a second pulley member rotatably mounted on the movable frame, the two pulley members being substantially horizontally disposed in spaced relationship with respect to each other, a third pulley member disposed below the second mentioned pulley member and horizontally spaced toward the other of said pulley members and being rotatably mounted on the movable frame, a fourth pulley member rotatably mounted on the stationary frame below the third pulley but horizontally spaced therefrom in the direction of the second pulley, belt means operating about the pulley members, drive means operatively connected to the belt means to move the belt means about the pulley members, and a vertically reciprocating knife mounted on the frame, the second pulley member being disposed adjacent to the knife.

9. The combination of a base, a vertically disposed frame, means mounting the frame for horizontal reciprocation on the base, a conveyor including belt means mounted for movement to the frame, a second conveyor mounted on the other side of the frame and for movement away from the frame, a knife supporting member slidably mounted for vertical movement on the frame, and hold-down mechanism including a downwardly projecting foot disposed directly above the second conveyor, means on the base mounting the foot for vertical movement with respect to the second conveyor, and means on the frame engaging the last mentioned mounting means for raising the foot when the frame moves in one direction and for lowering the foot when the frame moves in the opposite direction.

10. The combination of a base, a vertically disposed frame mounted on the base including a pair of upright frame members horizontally spaced apart, a vertical sliding member mounted on each upright, a plurality of horizontally disposed knives mounted one above the other and extending between the two sliding members, and means mounting each knife on the sliding members including a lever arm pivoted to one end of the knife and to the adjacent sliding member and being adapted to impart reciprocating motion to the knife in a direction corresponding to the length of the knife.

11. The combination of a base, an inverted U-shaped upright frame on the base, means on said frame mounting the frame for horizontal, reciprocating movement on said base, a cutting platform on the base, spacers dividing the platform into segments and extending in the direction of horizontal movement of said frame between the legs of the U-shaped frame, a knife supporting member slidably mounted on each leg, a knife disposed horizontally between each knife supporting member and spanning all of the segments, the knife supporting members providing reciprocation of the knife in a direction parallel to the direction of the length of the knife.

ROBERT F. MORRISON.
ERNEST C. CLEMENT.

REFERENCES CITED

The following references are of record in the file of this patent:

UNITED STATES PATENTS

| Number | Name | Date |
|---|---|---|
| 1,130,979 | Johnson | Mar. 9, 1915 |
| 2,109,812 | Whitefield | Mar. 1, 1938 |
| 2,112,443 | Martoccio | Mar. 29, 1938 |